Patented Apr. 23, 1935

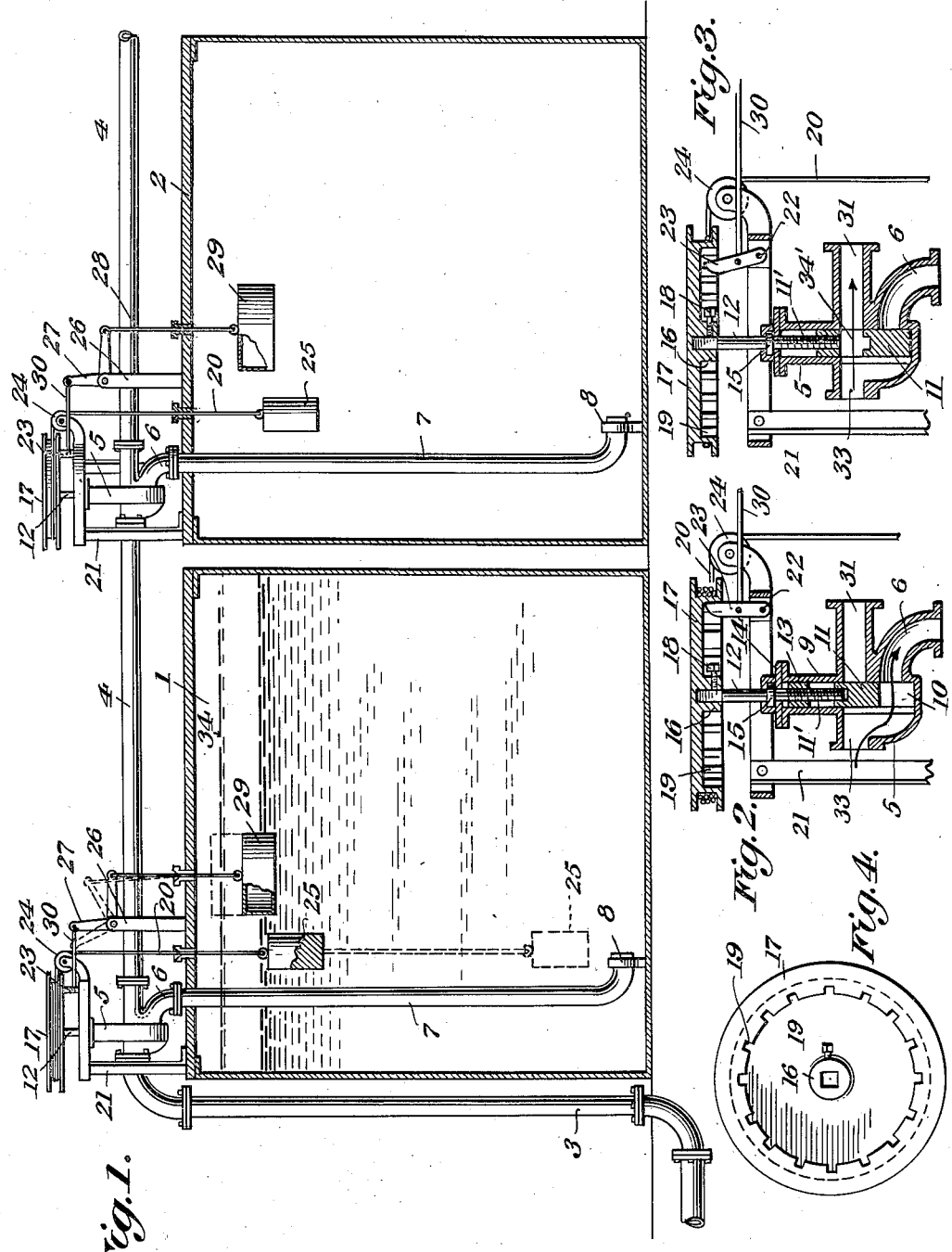

1,999,095

UNITED STATES PATENT OFFICE 1,999,095

AUTOMATIC CONTROL VALVE

Bige Gregory, Henderson, Tex., assignor of one-half to De France Russell, Overton, Tex.

Application June 22, 1932, Serial No. 618,739

1 Claim. (Cl. 137—139)

The object of this, my present invention, is the provision of automatic means for successively filling a battery of tanks with oil or like liquid and in which valve means, operated by weights and controlled by floats in the several tanks, operate successively to admit the flow of the liquid into each successively arranged tank and cut off such flow from the remaining tanks.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Figure 1 is a side elevation of the improvement applied to two tanks that provide containers for liquid, the tanks being in section.

Figure 2 is an enlarged sectional view through one of the gate valves employed in the operating and control mechanism therefor, with the valve in one position.

Figure 3 is a similar view with the valve in another position.

Figure 4 is a plan view looking toward the outer face of the peripheral grooved wheel to which the threaded valve operating rod is connected.

While any desired number of tanks for containing liquid, such as oil or the like may be employed I have illustrated only two of such tanks in the drawing. The tanks 1 and 2 are of the same size and, therefore, designed to contain the same quantity of liquid.

Before proceeding with a detail description of the invention it is thought well to state that ordinarily the flow or main liquid pipe has branches connected to the several tanks which are provided with valves which are hand operated so that the filling of these tanks to the proper level, approximately six inches from the top of the tanks, is largely a matter of guess and is, therefore, unreliable.

The main pipe line 3 through which the liquid is conducted from a suitable source has a horizontal branch 4 arranged a suitable distance above the tops of the tanks, and the pipe sections constituting the main line have their ends flanged in the usual manner. In the horizontal part 4 of the main line, and directly above each of the tanks I arrange my improvement. The improvement essentially comprises a casing 5 for a gate valve which will hereinafter be set forth in detail. The casing 5 is formed on the confronting ends of short pipe sections which are headed and which heads abut with and are securely fixed to the heads of the sections constituting the line 4, and the longitudinal branches of this pipe or fitting have communicating therewith a bypass or downwardly directed branch 6 that in turn is connected with the intake pipe section 7 arranged in each of the tanks 1. Preferably the lower ends of the pipes 7 are kerfed and these ends are supported by suitable brackets 8 fixed on the bottom of the tanks.

The bottom portion 9 of each of the valve casings is of rectangular formation in plan and the inner side walls of the body communicate with grooves 10 arranged in the sides of the valve casing and disposed below the bore of the branch or bypass 6. Arranged for slidable movement in the said grooves and bottom there is a substantially rectangular gate valve 11 that has swivelly secured to its upper end the threaded portion 11' of a shank 12. The threaded portion 11 passes through a nut 13 which is fixedly secured in the bottom, the outer or top of the bonnet being flanged and has arranged thereover and secured thereto a packing box 14. The packing box is provided with a groove or chamber for an annular enlargement or head 15 on the non-threaded end of the shank or rod 12. The outer end of each of the rods 12 is received in the bore of a depending boss 16 which is centrally formed on the inner face of a peripherally grooved wheel 17. A binding element 18 is screwed through the boss and contacts with the rod 12. The lower face of each of the wheels 17 is open and is provided with teeth 19, while wound around the grooved periphery of each of the wheels 17 and having one of their ends fixed in said groove there is a cable 20.

On the top of each tank there is secured a frame 21, the horizontal members of which receiving therethrough the rod 12 and the said frame has loosely pivoted thereto, as at 22, a dog 23 to engage between the teeth 19 of the wheels 17. One end of each of the brackets has pivotally mounted thereon a grooved wheel 24 over which the cable 20 is trained, is directed downwardly and passes through a packing box at the top of each of the tanks 1 and has attached to the end thereof a weight 25.

On each of the tanks there is an upright 26 and there is pivoted thereto a crank lever 27. To the normally horizontal arm of the crank lever there is fixed a rod or flexible element 28 that passes through a sleeve in the top of each of the tanks and which has secured to its end a float 29, the second arm of the bell crank lever having loosely connected thereto a rod 30 which is also loosely connected to the dog 23.

The cable 20 is wound around the drum as disclosed by Figure 2 of the drawing, the turning of the drum, upon the winding of the cable turning the stem 12 to raise the gate valve 11 to a position to close the outlet pipe branch of the valve casing which is indicated for distinction by the numeral 31 in the said Figure 2.

The float is in the full line position shown by Figure 1 of the drawing and the weight thereof swings the bell crank lever to bring the dog 23 to engage between two of the teeth 19 of the wheel 17. These are the initial positions of the parts in all of the tanks. The oil or like liquid flowing through the pipe 3 into the branch 4 will be first directed through the intake pipe end 33 of each of the valve casings 5 and as the valve 11 obstructs the passage 31 the liquid will flow through the bypass 6 and enter the tank through the pipe 7. The liquid in the tank 1 rises to the level of the upper dotted line 34 in the tank 1, raising the float 29, causing the rod 28 to swing the bell crank lever to throw the dog 23 out of engagement with the teeth of the wheel 17, as disclosed by Figure 3 of the drawing. This releases the wheel and permits the weight to descend to the dotted line position shown in the tank 1 in Figure 1 of the drawing. The turning of the wheel 17 will impart a like turning to the rod 12 so that the same will work through what I have termed the nut 13 (which in reality is the upper portion of the valve gate 11) to cause the gate valve to be moved downwardly in the groove 10 to shut off the bypass 6 and open the intake and outlet branches 33 and 31 of the valve casing 5. This permits of a flow of liquid through the opening 34' between the upper and interiorly threaded portion and the lower portion thereof so that the entrance of liquid to the tank 1 will be shut off. The valve in the tank 2 is positioned, as previously inferred, to close the branches 33 and 31 in the pipe portions of the valve casing 5 so that this valve is in the position disclosed by Figure 2 of the drawing and as the liquid now flows directly through the line 4 as the entrance of the liquid to the tank 1 is closed, the said liquid will flow through the inlet pipe 7 of the tank 2 to operate the float 29 to release the dog and to permit of the weight unwinding the wheel 17 on the said tank 2 to fill the tank to the proper determined level and also to close the branch or bypass 6 in the valve casing to the pipe line 4. In this manner it will be seen that each of a battery of tanks is individually and successively filled with a liquid in a manner that is entirely automatic and that the level of the liquid in each of the tanks is the same. It is also thought that after the foregoing description has been read in connection with the accompanying drawing, that the construction and advantages of the invention will be understood and appreciated so that further detailed description will not be required.

What I claim is:—

An automatic diverter valve structure comprising a casing having an inlet and a plurality of outlets, a vertically movable slide valve fitted in the casing to alternately open and close said outlets, a stem swiveled in the casing above the valve and threaded therewith, a squared upper end on said stem, a horizontally disposed peripherally grooved wheel having a center hub provided with a squared socket for receiving the squared upper end of the stem, said wheel having a circular countersunk portion in its under face, teeth formed in the circumferential wall of said countersunk portion, a thick horizontal support between the wheel and said casing, a dog pivoted at its lower end to the support and having its upper end engageable with the teeth, a bell crank lever pivotally supported spaced from the support, a link connection between the bell crank lever and said dog, a pulley journaled on the support, and a weighted cable trained over the pulley and connected with said wheel for winding on and from the same.

BIGE GREGORY.